US012747105B2

(12) United States Patent
Aufsfeld et al.

(10) Patent No.: US 12,747,105 B2
(45) Date of Patent: Sep. 29, 2026

(54) CONVEYOR ARRANGEMENT

(71) Applicant: INTERROLL HOLDING AG, Sant'Antonino (CH)

(72) Inventors: Stefanie Aufsfeld, Hückelhoven (DE); Jan Moseley, Hückelhoven (DE); Jan Jensen, Hückelhoven (DE); Christian Ripperda, Hückelhoven (DE)

(73) Assignee: INTERROLL HOLDING AG, Sant'Antonino (CH)

( * ) Notice: Subject to any disclaimer, the term of this patent is extended or adjusted under 35 U.S.C. 154(b) by 62 days.

(21) Appl. No.: 18/840,054

(22) PCT Filed: Feb. 6, 2023

(86) PCT No.: PCT/EP2023/052781
§ 371 (c)(1),
(2) Date: Aug. 20, 2024

(87) PCT Pub. No.: WO2023/160993
PCT Pub. Date: Aug. 31, 2023

(65) Prior Publication Data
US 2025/0153942 A1 May 15, 2025

(30) Foreign Application Priority Data
Feb. 22, 2022 (EP) .................................... 22157909

(51) Int. Cl.
*B65G 1/10* (2006.01)
*B65G 41/00* (2006.01)

(52) U.S. Cl.
CPC ............. *B65G 1/10* (2013.01); *B65G 41/008* (2013.01)

(58) Field of Classification Search
CPC .............. B23Q 7/1447; Y10T 29/5135; B07C 2501/0063; B07C 5/00; B07C 5/362;
(Continued)

(56) References Cited

U.S. PATENT DOCUMENTS 11,208,270 B1 * 12/2021 Sewart ................. B65G 1/1371
2002/0153231 A1 10/2002 Horne
(Continued)

FOREIGN PATENT DOCUMENTS

DE 102018130300 A1 6/2020
DE 102018130330 A1 2/2023
(Continued)

OTHER PUBLICATIONS

Rvjimd, "Spring tension idler for conveyor build", Jun. 25, 2017, https://www.youtube.com/watch?v=O1rDVR9ytmw (Year: 2017).*
(Continued)

*Primary Examiner* — Gene O Crawford
*Assistant Examiner* — Amari J Meddling
(74) *Attorney, Agent, or Firm* — Biotech Beach Law PC; Raymond Wagenknecht

(57) ABSTRACT

A conveyor arrangement with a first mobile conveyor, which includes a first conveying track adapted to convey an object, and a drive module adapted to change its position within an area of operation. The first conveying track is fixed to the drive module so that changing the position of the drive module leads to a similar change of the first conveying track. By operation of the drive module, a first mobile conveyor is transferred between a handover state, and a separated state in relation to a second conveying track of a second conveyor. During the handover state, the first conveying track is in alignment with the second conveying track; and during the separated state the first conveying track is not in alignment with the second conveying track so that the object cannot be transferred between the first conveyor and the second conveying track.

10 Claims, 5 Drawing Sheets

(58) Field of Classification Search
CPC ...... B07C 5/361; B65G 1/10; B65G 2207/40; B65G 41/008; B65G 43/00; B65G 43/10; B65G 1/1371; B65G 1/1373; B65G 17/36; B65G 17/485; B65G 2201/0202; B65G 2203/0216; B65G 2203/025; B65G 2203/0283; B65G 2203/0291; B65G 2203/041; B65G 2203/044; B65G 25/02; B65G 43/08; B65G 47/52; B65G 47/61; B65G 47/62
See application file for complete search history.

(56) References Cited

U.S. PATENT DOCUMENTS

| | | | | |
|---|---|---|---|---|
| 2016/0167888 | A1* | 6/2016 | Messina ............... | G05D 1/0287 198/315 |
| 2020/0033883 | A1* | 1/2020 | Theobald ............. | G05D 1/0282 |

FOREIGN PATENT DOCUMENTS

| | | | |
|---|---|---|---|
| EP | 3373232 | A1 | 9/2018 |
| EP | 3862839 | A1 | 1/2021 |

OTHER PUBLICATIONS

International Search Report and Written Opinion for PCT/EP2023/052781 mailed Feb. 6, 2023.

* cited by examiner

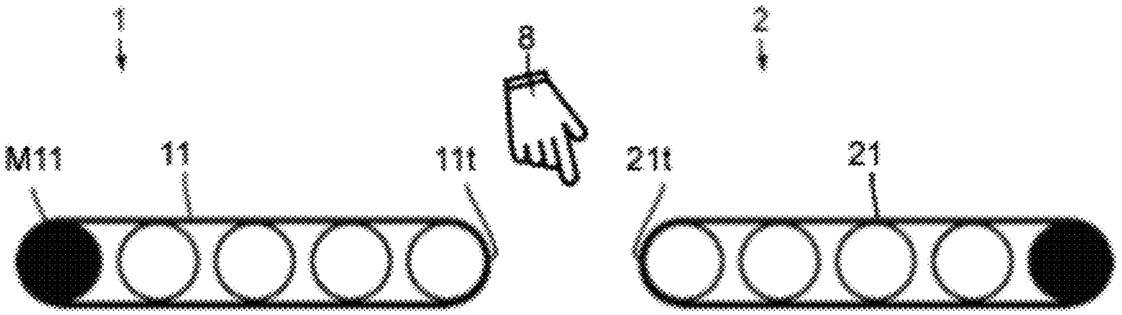
fig. 5
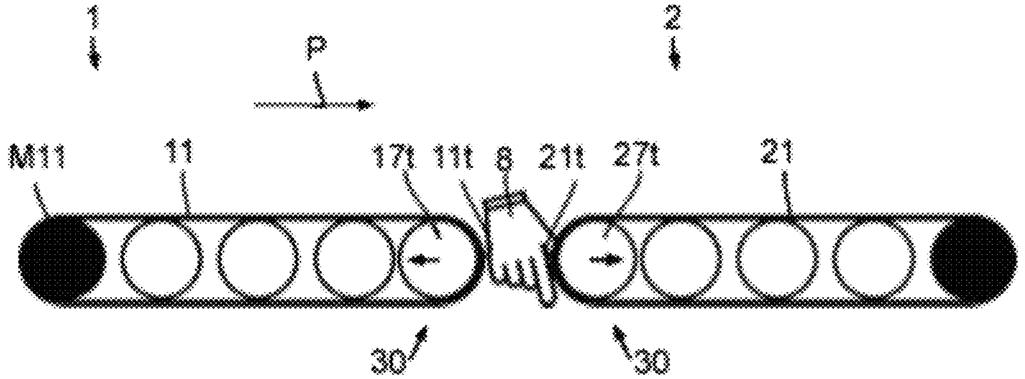
fig. 6
fig. 7a
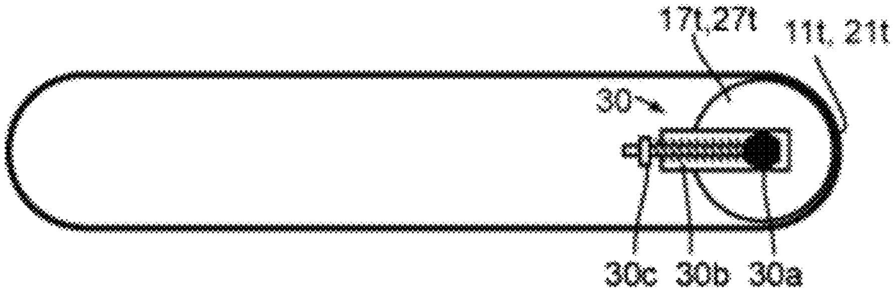
fig. 7b
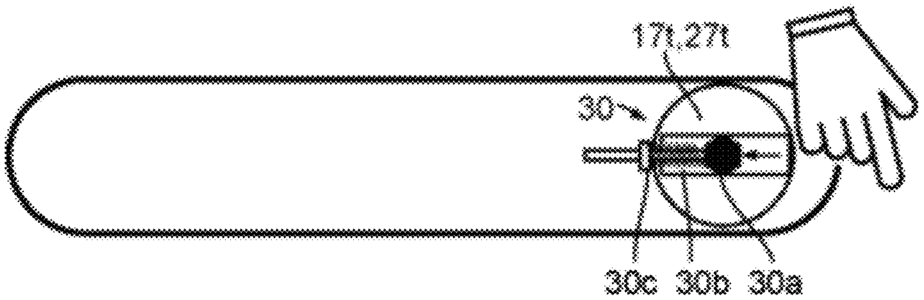

CONVEYOR ARRANGEMENT

TECHNICAL FIELD

The invention refers to a conveyor arrangement.

BACKGROUND OF THE INVENTION

EP 3 373 232 B1 discloses am intralogistics arrangement. Thereby an object can be delivered between several handling stations. A drive unit can be moved along a mechanical trackbound conveying path. Depending on the position of the drive unit, the drive unit can drive rollers which are located above the drive unit. An object lying on top of the drive roller is consequently moved by the driven roller.

US 2016/0167888 A1 discloses a robotic device having a conveyor, including a conveyor belt, a conveyor motor coupled to at least one conveyor cylinder and configured to rotate the at least one conveyor cylinder to rotate the conveyor belt in at least one direction. A connector is provided and adapted to engage with a connector receptacle of another conveyor. A rotating head detachably coupled to the conveyor and configured to rotatably maneuver the conveyor in at least one direction. A drive module coupled to the rotating head and configured to move the robotic device in at least one direction.

DE 10 2018 130 330 A1 discloses a device for conveying and aligning objects, The device comprising a conveying device which has two conveyor belts which are arranged essentially parallel to one another and can be driven independently of one another, and a detection device for detecting on the conveyor arranged object. An an evaluation device is provided for evaluating the position and orientation of the detected object. A control and regulation unit is set up to control the conveyor belts depending on the evaluation.

EP 3 862 839 A1 A discloses a transport system having a load table with a traveling body configured to transport an object placed on the load table. The traveling body including a storage unit configured to store map information including a position of the load table and self-position information indicating a position of the traveling body. An environment recognition unit is provided to acquire data indicating a position of the traveling body.

US 2002/0153231 A1 discloses a conveyor apparatus having a conveyor framework and an idler rotatably and releasably mounted to the conveyor. The framework has a quick release means which dismounts the idler in response to a situation where a person's hand becomes trapped between a conveyor belt and an idler roller.

US 2020/0033883 A1 discloses a mobile robot for use in an operating environment. The mobile robot includes a mobile robot base, a conveyor system and a drive system. The conveyor system is supported by the mobile robot base. The conveyor system includes a conveyor belt configured to receive an item with the mobile robot and/or provide the item from the mobile robot. The conveyor system is configured to support the item during movement of the mobile robot within the operating environment. The drive system is arranged with the mobile robot base. The drive system is configured to move the mobile robot within the operating environment and position the conveyor system such that the conveyor belt is operable to receive the item with the mobile robot and/or provide the item from the mobile robot.

SUMMARY OF THE INVENTION

It is the object of the invention to provide systems and methods to convey objects along a non-mechanically trackbound conveying path between several locations. This object is solved by a conveyor arrangement and use of a conveyor device.

The conveyed object can be transferred between the first conveying track and the second conveying track. That means that by operating the first conveying track and/or by operating the second conveying track the object can be transferred from the first conveying track to the second conveying track or from the second conveying track to the first conveying track. Transferring between the first and the second conveying track means transferring from the first to the second conveying track and/or vice versa.

In the separated state the conveying tracks are located at such a large distance to each other that it is impossible to transfer an object between the first and the second conveying track by operation of at least one of the conveying tracks.

The present invention provides also an arrangement, which is easy to install and does not need large infrastructural provisions. Also, the arrangement can be modified easily. This is achieved by one or more of the following embodiments.

In an embodiment a first mobile conveyor has a first connector adapted to provide a, in particular wired, connection between the first conveyor and the second conveyor in the handover state. The first connector is adapted to transfer energy between the first conveyor and the second conveyor in the handover state, and/or to transfer data between the first conveyor and the second conveyor in the handover state, in particular in combination via a second connector of the second conveyor. Hereby energy and/or controlling can be provided by one of the conveyors, so that only one of the conveyors needs to be provided with a controller or an energy storage.

In an embodiment, the first connector and the second adapter are adapted to establish a wireless connection between the first conveyor and the second conveyor in the handover state. In particular, the wireless connection is adapted to transfer energy between the first conveyor and the second conveyor, the transferred energy is used to power the second conveying track. As an example, a near field communication (NFC) technology may be used, where technologies are able to transfer power in the area of up to 100 W, which is sufficient for the powering the conveying track.

In an embodiment, the first conveyor has an energy storage for providing power for the operation of the drive module, in particular via a powerline. The conveyor arrangement is adapted to provide energy from the energy storage for the operation of the second conveying track during the handover state. Here a single energy storage can be used for a plurality of conveyors. Here a particular second conveyor needs to be powered merely when the first conveyor is in a handover state with the particular second conveyor, so that a separate energy storage or a wiring to the second conveyor can be omitted.

In an embodiment, the first conveyor has a controller, the controller is in particular adapted to receive a sensor signal from a first sensor of the first conveyor and to issue a control signal to a first conveyor motor driving the first conveying track or to a module drive driving the drive module. In the handover state the controller may adapted to receive a sensor signal from a second sensor of the second conveyor. The controller adapted to issue a control signal to a second conveyor motor for driving the second conveying track in the handover state. Also here the controller of the first conveyor takes over a respective task also for the second conveyor, so that a huge number of controllers for each second conveyor can be omitted. Here merely in the handovers state a conveying operation of the second conveyor is performed, which controlled by the controller of the first conveyor.

In an embodiment, the arrangement has a crush protection, which is adapted to prevent crushing a user's hand when protruding between the first and the second transfer edge. This is of particular relevance if the tolerances of the mobile drive are larger than the minimum distance between the two conveyors in the handover state. By merely controlling the drive operation it cannot be ensured that a distance between the two conveyors is always that large, that a hand cannot be crushed between the conveyors. The crush protection prevents injuries in cases where the transfer edges of the conveyors get too close to each other. In principle the transfer edge can be considered as the most protruding area of a transfer track in direction to the other conveying track.

A crush sensor may be provided to detect a crush situation. In case a crush situation is detected, a driving operation of the drive module of the first conveyor may be stopped.

BRIEF DESCRIPTION OF THE DRAWINGS

An exemplary embodiment of the invention is described with respect to the following drawings; which herein show FIG. 1 an exemplary conveying arrangement in top view having a mobile conveyor and a plurality of stationary conveyors;

FIG. 5 conveying tracks of the mobile conveyor and the of stationary conveyor according to FIG. 2*a* in the separated state;

FIG. 6 conveying tracks of the mobile conveyor and the of stationary conveyor according to FIG. 2*a* during triggering of a crush protection;

FIGS. 7*a*-*b* a first embodiment of a conveying track with an untriggered crush protection (FIG. 7*a*) and a triggered crush protection (FIG. 7*b*);

DESCRIPTION

Figure 1:
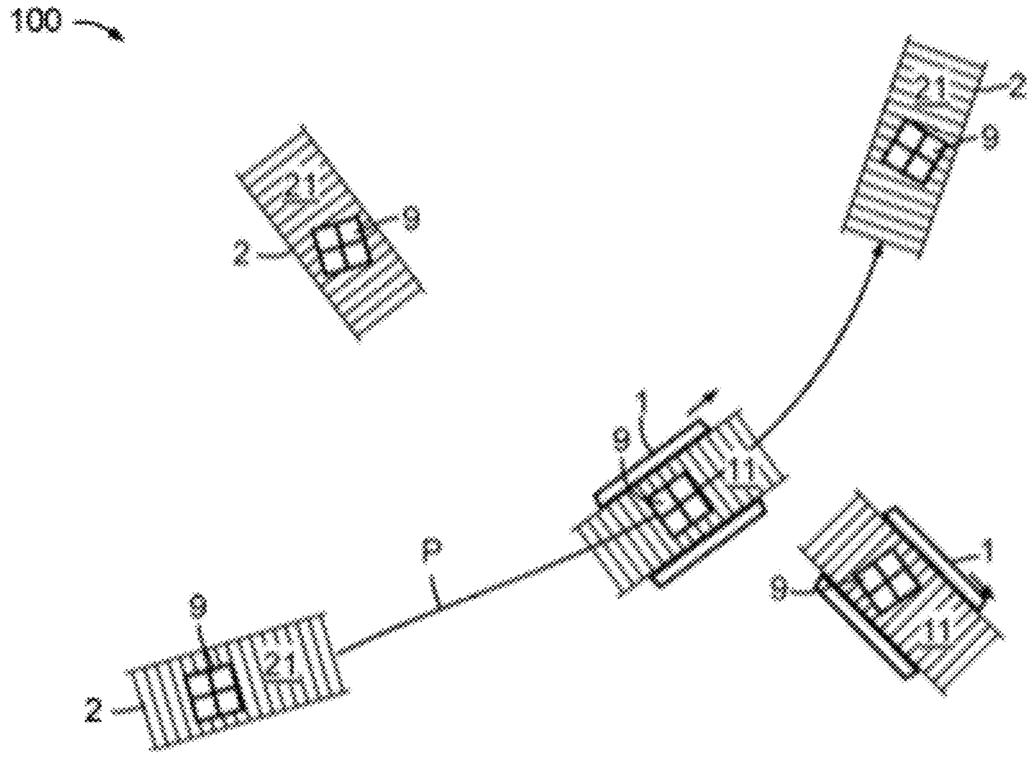
Figure 2A:
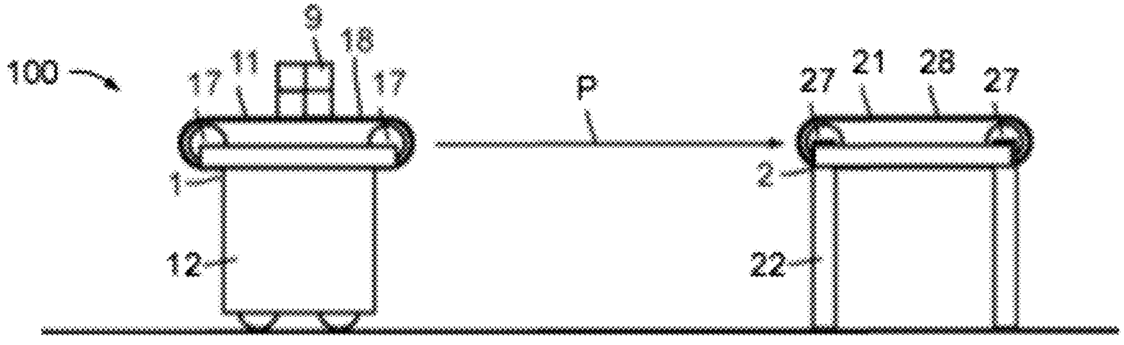
FIGS. 2*a*-*b* a mobile conveyor and a stationary conveyor of the conveying arrangement according to FIG. 1 in side view, wherein the conveying track is a belt conveying track (FIG. 2*a*) or a roller conveying track (FIG. 2*b*)
Figure 2B:
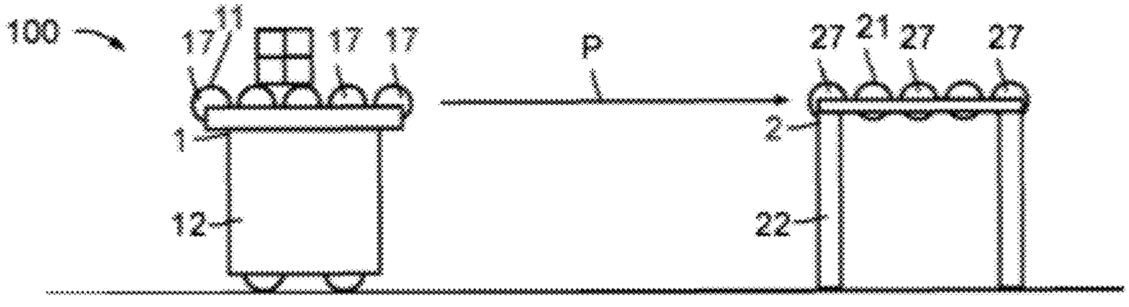

FIG. 1 shows an exemplary conveying arrangement 100 in top view. FIGS. 2*a*-*b* show components of the conveying arrangement 100 in side view.

The conveying arrangement 100 has a number of second stationary conveyors 2.

Stationary means that during intended use the location of the second stationary conveyors 2 is fixed. But it is possible that during a modification of the conveying arrangement 100 the location of the stationary conveyors 2 may be changed from time to time, where such modification usually happens outside of the intended usage.

The second stationary conveyor 2 has a second conveying track 21 and a support frame 22 on which the second conveying track 21 is mounted.

The conveying arrangement 100 has at least one, in particular a plurality of, first mobile conveyors 1. The first mobile conveyor 1 is adapted to drive within the conveying arrangement 100, which is herein called the "driving operation". The first movable conveyor 1 has a first conveying track 11 and a drive module 12, on which the first conveying track 11 is mounted.

With the conveying arrangement 100 an object 9 can be transported between any of the second stationary conveyors 2 by means of the first mobile conveyor 1 along a conveying path P. The conveying path P doesn't need to be a predefined conveying path; here the mobile conveyor 1 may drive autonomously along any in particular a shortest conveying path P.

As FIGS. 2*a*-*b* show the conveying tracks 11, 21 may be of different kinds of conveying tracks. In an embodiment the conveying track has a belt conveying track (FIG. 2*a*). The belt conveying track has a conveyor belt 18 which is arranged around rollers 17. In an alternative embodiment, the conveying track is a roller conveying track (FIG. 2*b*) having a plurality of rollers 17, 27 arranged one behind the other and forming a conveying surface. The first conveying track 11 can be a different kind than the second conveying track 21.

Figure 3:
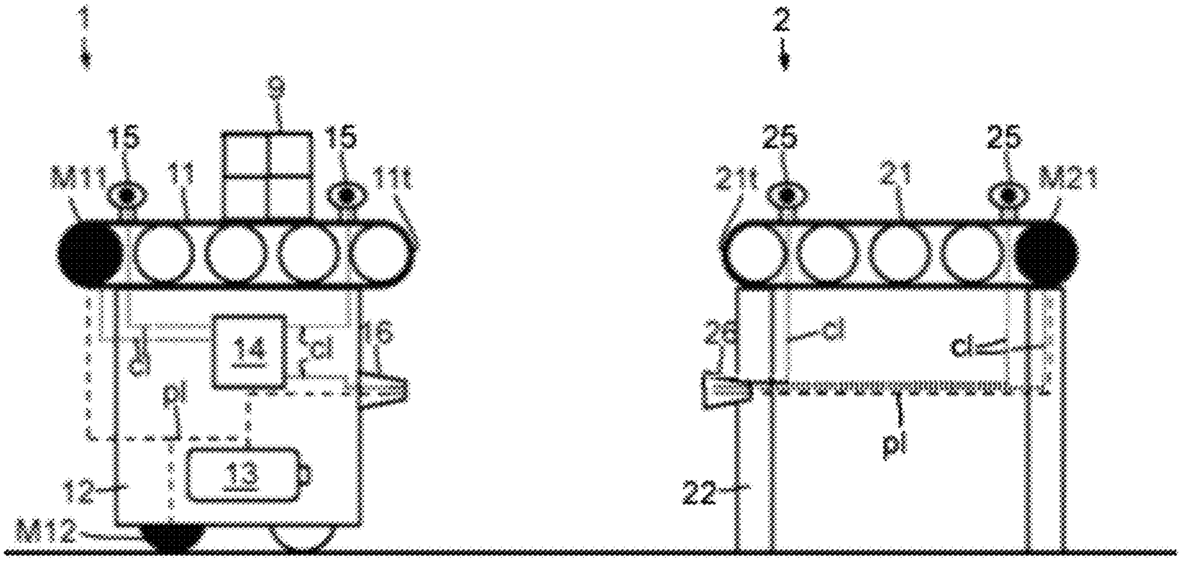
FIG. 3 the mobile conveyor and the of stationary conveyor of the conveying arrangement according to FIG. 2*a* in a separated state in more detail.
Figure 4:
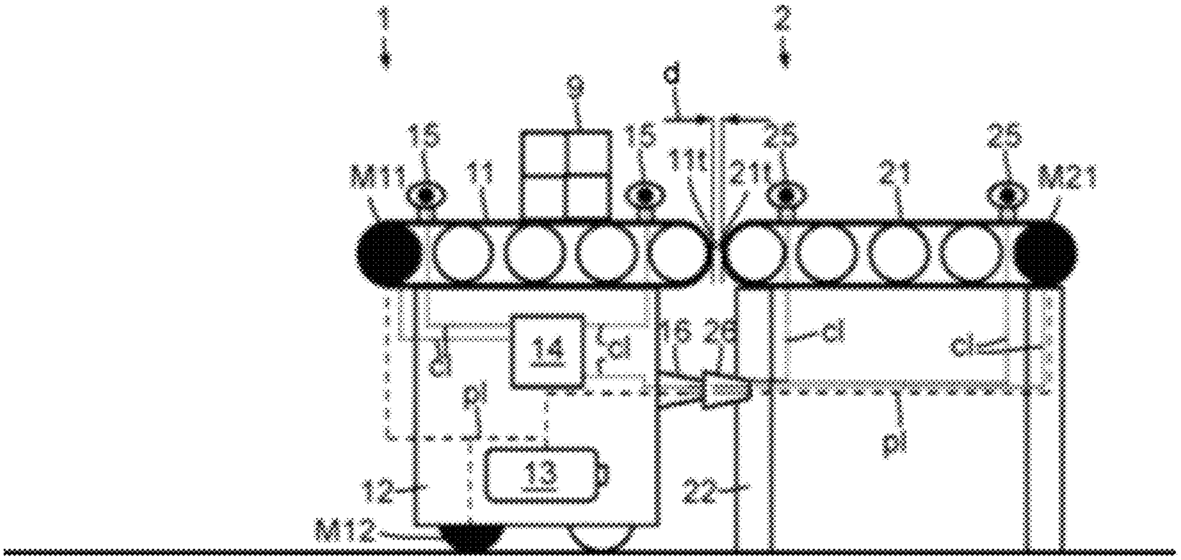
FIG. 4 the mobile conveyor and the of stationary conveyor of the conveying arrangement according to FIG. 2*a* in a handover state in more detail.

In some of the following figures the conveying track is illustrated as a combined roller and belt conveying track (see e.g. in FIGS. 3, 4). The intention of this combined illustration is to show, that any kind of conveying track can be used.

According to FIG. 3 the first mobile conveyor 1 has a module drive M12. The module drive M12 is adapted to provide a drive power to the drive module 12 so that the drive module 12 can change its position within the conveying arrangement 100 in the driving operation.

The first mobile conveyor 1 has a first conveyor drive M11. The first conveyor drive M11 is adapted to provide a drive power to the first conveying track 11 so that an object 9 located in the first conveying track 11 is conveyed during a conveying operation.

The first mobile conveyor 1 has an energy storage 13 for storing electric energy, in particular an electrochemical battery. The energy storage 13 provides electrical power to the first conveyor drive M11 and the module drive M12.

The first mobile conveyor 1 has a first presence sensor 15 adapted to detect the presence of an object 9 to be conveyed along a predefined area of the first conveying track 11. In an embodiment there are more than one first presence sensors 15 provided. In an embodiment the one or more first presence sensors 15 can be used to determine the exact position of an object within the first conveying track 11.

The first mobile conveyor 1 has a controller 14 adapted to control operation of the first conveyor drive M11 and the module drive M12. The first presence sensors 15 are connected to the controller 14 and provide input values for the controller 14.

The second stationary conveyor 2 has a second conveyor drive M21. The second conveyor drive M21 is adapted to provide a drive power to the second conveying track 21 so that an object located on the second conveying track 21 is conveyed during a conveying operation.

The second stationary conveyor 2 has a second presence sensor 25 adapted to detect the presence of an object 9 to be conveyed along a predefined area of the second conveying track 21. In an embodiment there are more than one second presence sensors 25 provided. In an embodiment the one or more second presence sensors 25 can be used to determine the exact position of an object 9 on the second conveying track 21.

The first mobile conveyor 1 has a first connector 16; the second stationary conveyor 2 has a second connector 26. In the separated state (FIG. 3) the first connector 16 is separated from the second connector 26. In the handover state the first connector 16 is connected to the second connector 26.

In an embodiment the handover state the second conveyor drive M21 is connected via the second connector 26 and the first connector 16 to the energy storage 13 (of the first movable conveyor 1) via a power line pl. This has the advantage that the plurality of second stationary conveyors 2 can be powered without the need to provide a separate energy supply to all of the second conveyors 2. In particular no external wiring needs to be provided to all of the second stationary conveyors 2. So the second stationary conveyors 2 can be easily installed. Also from time to time the location of the second stationary conveyors 2 can be amended with easy effort.

In the embodiment of FIGS. 3 and 4 the connector is an electrical connector. In an alternative embodiment, the connectors 16, 26 may be mechanical connectors. Here a drive power for powering the second conveying track 21 is mechanically transferred from the first 1 conveyor to the second conveyor 2. The first connector and the second connector may constitute a mechanical clutch which is closed during the handover state and which is open during the separated state. An actuator for driving the second conveying track 21 may be located on the first conveyor 1.

In alternative embodiment the connectors may be wireless and in particular non mechanical. As an example and NFC or Infrared connection may be used which is also suitable for transferring energy in the scope of max 100W. The connector may be an inductive connector.

In an embodiment, the operation of the second conveyor drive M21 is controlled by the controller 14 (of the first movable conveyor 1). The second conveyor drive M21 is in the handover state connected via the second connector 26 and the first connector 16 to the controller 14 (of the first movable conveyor 1) via a control line cl. This has the advantage that the plurality of second stationary conveyors can be controlled without the need to provide a controller to each of the second conveyors 2. So the second stationary conveyors 2 can be easily installed.

In an embodiment also the one or more second presence sensors 25 are in the handover state connected via the second connector 26 and the first connector 16 to the controller 14 (of the first movable conveyor 1) via a control line cl.

The controller is in particular adapted for hot swapping (also called hot-plugging). That means, that devices, with which the controller communicates, may be connected and disconnected during the operation of the controller.

An object 9 can be transferred between the first mobile conveyor 1 and the second stationary conveyor 2. That means that the object 9 can be transferred from the first mobile conveyor 1 to the second stationary conveyor 2 or from the second stationary conveyor 2 to the first mobile conveyor 1.

For transferring the object 9 between the conveyors 1, 2, the conveyors tracks 11, 12 are to be aligned with each other. FIG. 4 shows the first mobile conveyor 1 and a second stationary conveyor 2 in a handover state.

In the handover state a first transfer edge 11*t* of the first conveying track 11 and a second transfer edge 21*t* of the second conveying track 21 are to be aligned with each other such that these are facing each other at a distance d of max. 10 cm (FIG. 4). Such small distances bear always the risk of injuries in case the desired distance is not exactly matched. To avoid injuries the conveying arrangement 100 has a crush protection 30.

In the crush protection 30 the first and/or the second transfer edges 11*t*, 21*t* are supported resiliently. If a user's hand protrudes during the handover state transfer between the transfer edges 11*t*, 21*t* the transfer edges are urged in the opposite direction facing away from the respective other transfer edge to avoid crushing the hand (FIG. 6).

As can be understood in an embodiment merely one of the first or second transfer edges 11*t*, 21*t* may be supported resiliently in the manner to provide a sufficient protective effect.

As can be understood the effect can be achieved in the context of a roller conveyor according to FIG. 2*b* or of a belt conveyor according to FIG. 2*a*.

FIGS. 7*a-b* show an exemplary implementation of the crush protection 30 in more detail at the first transfer edge which may be similarly implemented for the first and the second transfer edge.

The rollers 17*t*, 27*t* which forms the transfer edges 11*t* (in case of a belt conveying track in combination with the belt) are supported resiliently.

The roller is in particular the first roller of the first conveying track which is facing the second conveying track and/or the second roller of the second conveying track which is facing the first conveying track, when the first conveying track is approaching the second conveying track. The roller is hereinafter called the transfer roller 17*t*, 27*t*.

The transfer roller 17*t*, 27*t* is held in a roller support 30*a* which is movable in particular slidably supported relative to spring abutment 30*c*. Between the spring abutment 30*c* and the roller support 30*a* a spring 30*b* is provided urging the roller support away from the spring abutment 28*c* and in the direction of the transfer edge 11*t*, 21*t*.

The roller support 30*a* is movable in a direction facing away from the transfer edge.

Figure 8A:
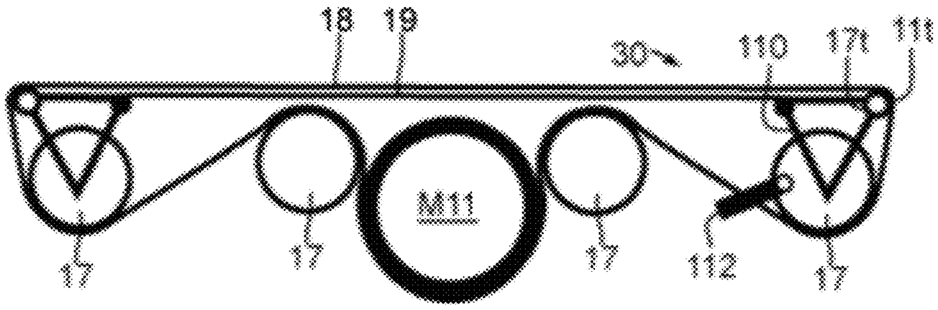
FIGS. 8*a*-*b* a second embodiment of a conveying track with an untriggered crush protection (FIG. 8*a*) and with a triggered crush protection (FIG. 8*b*)
Figure 8B:
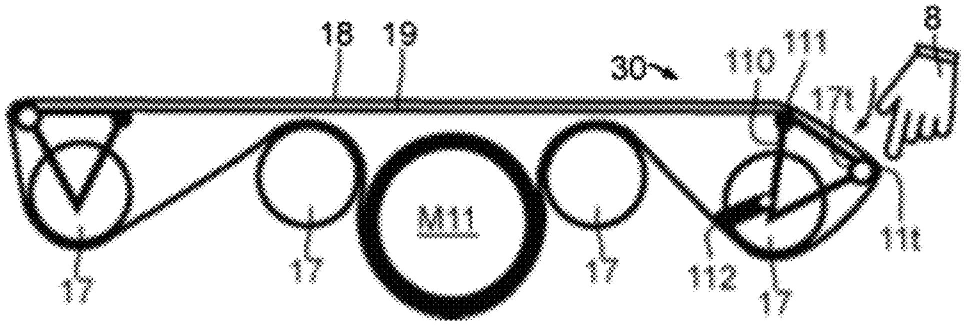

FIGS. 8*a-b* show another exemplary implementation of the crush protection 30 in more detail at the first transfer edge 1*t* which may be similarly implemented for the first and the second transfer edges 11*t*, 21*t*. Similar to the previous embodiment, the crush protection 30 can be applied to the first and the second conveyor.

The rollers 17*t* which forms the transfer edges 11*t* (in case of a belt conveying track in combination with the belt) are supported resiliently. Here the rollers 17*t* forming the transfer edge 11*t* is held by a deflection frame 110. The deflection frame 110 can be pivoted around a defection pivot 111 downwards to prevent a crushing a hand 8 (FIG. 8*b*).

The conveyor belt 18 is supported on a belt bed 19.

The embodiment of FIGS. 8*a-b* is particular advantageous for a belt conveying track, but also possible for a roller conveying track. Here the conveyor drive M11 may be a drum motor located at a distance to the transfer edges; in particular the drum motor 11M is located centrally.

A crush sensor 112 may be provided to detect a possible crush situation. In the embodiment of FIGS. 8*a-b*, the sensor 112 can determine if the deflection frame 110 is deflected. A similar but slightly adapted sensor can also be used in the embodiment of FIGS. 7*a-b*. The crush sensor may be a touch sensitive sensor. A spring similar to the spring shown in FIGS. 7*a-b* can be used for urging the deflection frame 110 in the undeflected position.

In case the crush sensor detects a possible crush situation, a driving operation of the first conveyor can immediately be stopped, which may be followed by an immediate subsequent drive operation in the reverse direction to increase the distance again.

Figure 9:
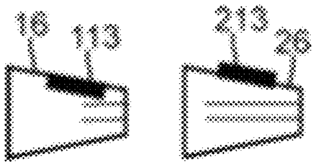
FIG. 9 details of the connectors each having a coupling.

There may be provided an coupling 113, 213 as shown in FIG. 9, which is in particular an electromagnetic coupling. As an example the coupling is part of the connectors 16, 26 but as an alternative can be provided separately to the connectors.

The coupling 113, 213 may be adapted to selectively provide a holding force between the first conveyor 1 and the second conveyor 2 in the handover state, preventing an unintentionally turn into the separated state. The electromagnetic coupling 113, 213 may switch off the holding force before intentionally turning from the handover state into the separated state.

In the example the coupling has a first coupling part 113 attached to the first conveyor 1 in particular to the first connector 16, and a second coupling part 213 attached to the second conveyor 2, in particular to the second connector 26. One of the first and the second coupling part 113, 213 has an electromagnet; the other coupling part 213, 113 has a permanent magnet.

Figure 10A:
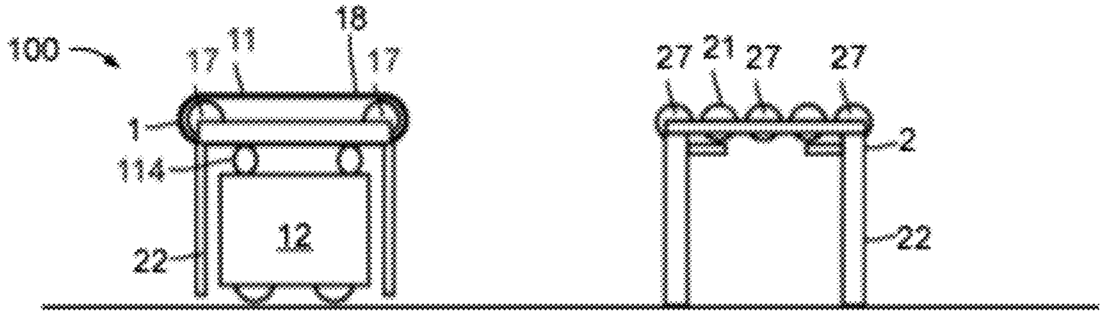
FIG. 10*a*-*d* another embodiment of the conveying arrangement according to FIGS. 2*a*-*b* during different conditions.
Figure 10B:
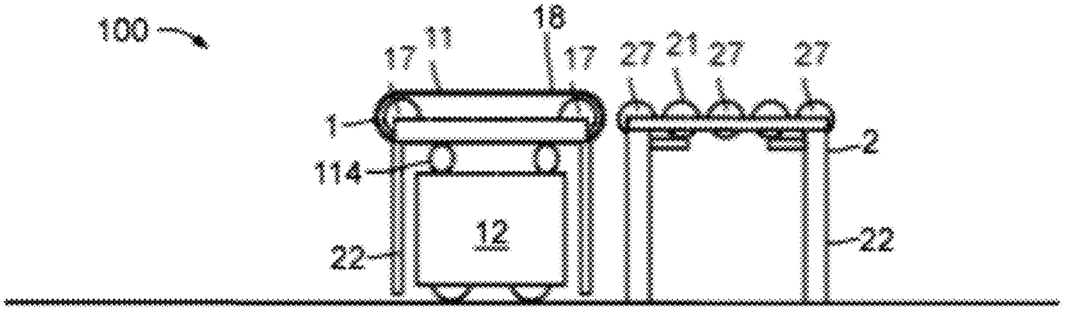
Figure 10C:
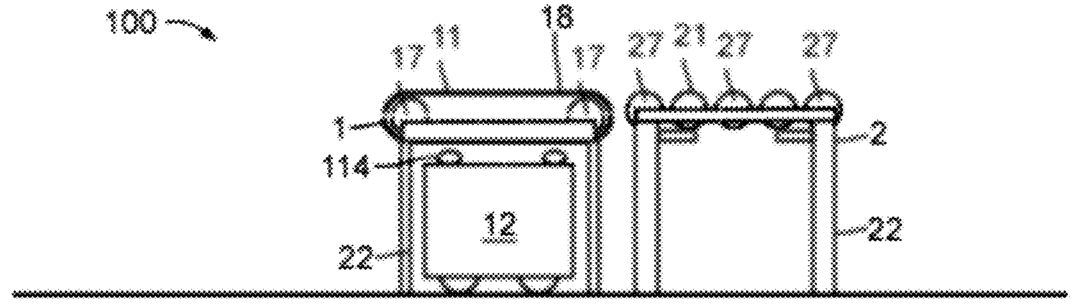
Figure 10D:
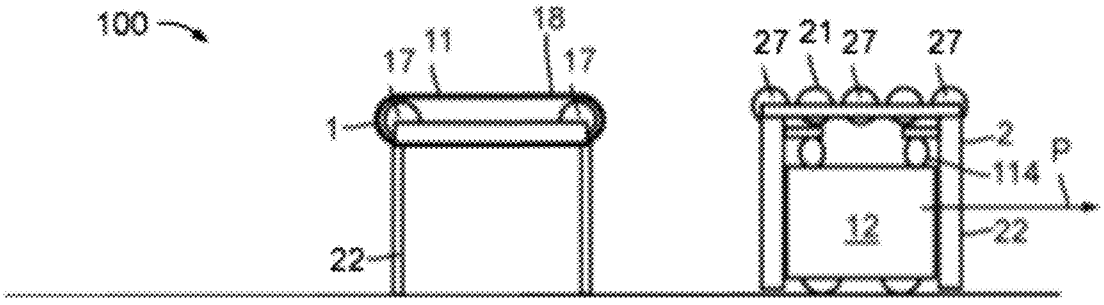

FIGS. 10*a-d* show a further embodiment of the invention. Here the drive module 12 is releasably fastened to the first conveying track by means of a fastener 114. The fastener 114 is adapted to provide selectively a fixed connection between the drive module 12 and the first conveying track 11. In the fastened condition the first conveying track 11 can be moved by the drive module 12 as shown in FIG. 10*a*. When the drive module 12 has reached a destination (FIG. 10*b*), the fastener 114 can be released (FIG. 10*c*). Now the drive track is not fastened to the drive module anymore. The conveying track is now stationary standing on a support frame 22. Now the drive module 12 can drive independently from the conveying track to another location and can be used to transport other conveying tracks. In particular the drive module may approach one of a second conveying track and may be fastened to the second conveying track in a similar manner as fastened to the first conveying track (FIG. 10*d*).

It is to be noted that any kind of fastening tracks (e.g. belt conveyor or roller conveyor) may be used in the embodiment of FIG. 10*a-d*.

The invention is particular relevant if the first mobile conveyor 1 is not mechanically trackbound. The lack of a mechanical track-binding may cause the problem, that an accuracy of the alignment between the conveyors in the handover state is subject to large tolerances. The smaller the tolerances get the more expensive a sensor technology or drive technology for supporting the accuracy becomes.

In contrast to a mechanical track-binding the none track-bound mobile conveyor can at least sectionally be guided by a contactless guiding system. A contactless guiding system may be implemented by an induction line fixed to the flat floor of the production hall. Such a contactless guiding system does not reliably provide an accurate positioning of the mobile conveyor at affordable costs as a mechanical track bound system.

The invention therefore provides safety at affordable costs even for a mobile conveyor which is not equipped with a mechanical track-bound system.

LIST OF REFERENCE SIGNS

100 Conveying arrangement
1 first conveyor/mobile conveyor
2 second conveyor/stationary conveyor
8 hand of a user
9 object to be conveyed
11 first conveying track
11*t* first transfer edge
12 drive module
13 energy storage
14 controller
15 first presence sensor
16 first connector
17 roller
17*t* roller at transfer edge
18 conveyor belt
19 belt bed
110 deflection frame
111 deflection pivot
112 crush sensor
113 first coupling
114 fastener
M11 first conveyor drive
M12 module drive
21 second conveying track
21*t* second transfer edge
22 support frame
25 second presence sensor
26 second connector
27 roller
27*t* roller at transfer edge
213 second coupling
M21 second conveyor drive motor
30 crush protection
30*a* roller support
30*b* spring
30*c* spring abutment
P conveying path
pl power line
cl control line
d distance between the transfer edges during handover state

The invention claimed is:

1. A conveyor arrangement (100), comprising a first mobile conveyor (1), comprising:

a first conveying track (11) adapted to convey an object (9) between different positions along the first conveying track (11), and a drive module (12) adapted to change its position within an area of operation, in particular in a non-mechanically track-bound manner;

wherein the first conveying track (11) is fixed to the drive module (12), so that changing the position of the drive module (12) leads to a similar change of position of the first conveying track (11);

wherein the conveyor arrangement (100) is adapted in a manner that by operation of the drive module (12) the first mobile conveyor (1) can be transferred between a handover state, and a separated state in relation to a second conveying track (21) of a second conveyor (2);

wherein during the handover state the first conveying track (11) is in alignment with the second conveying track (21) of the second conveyor (2), so that by operation of the first and second conveying tracks (11, 21) an object (9) can be transferred between the first conveyor (1) and the second conveyor (2);

wherein during the separated state the first conveying track (11) is not in alignment with the second conveying track (21) so that by operation of the first and second conveying tracks (11, 21) the object (9) cannot be transferred between the first conveyor (1) and the second conveying track (21);

wherein the conveyor arrangement (100) further comprises a crush sensor (112) adapted to detect a crush situation between the first and the second conveyor tracks (11, 21); and wherein the conveyor arrangement (100) is adapted to stop a driving operation of the drive module (12) in case of a detected crush situation.

2. The conveyor arrangement (100) according to claim 1, further comprising a second stationary conveyor (2), in particular a plurality of second stationary conveyors (2), comprising:

a second conveying track (21) adapted to convey said object (9) between different positions along the second conveying track (21), and a support frame (22) adapted to stationarily support the second conveying track (21) at a predefined position.

3. The conveyor arrangement (100) according to claim 1, wherein the first mobile conveying track (11) has a first transfer edge (11*t*) and the second conveying track (21) has a second transfer edge (21*t*);

wherein in the handover state the first transfer edge (11*t*) is facing the second transfer edge (21*t*) at a distance (d) of max 10 cm; and wherein the conveyor arrangement (100) comprises a crush protection (30) adapted to prevent crushing a user's hand when protruding between the first and the second transfer edge (11*t*, 21*t*).

4. The conveyor arrangement (100) according to claim 3, wherein the crush protection (30) comprises a roller support (30*a*) supporting a transfer roller (17*t*, 27*t*) forming the transfer edge (11*t*, 21*t*), and wherein the roller support (30*a*) is movable in a direction facing away from the transfer edge (11*t*, 21*t*) and is urged, in particular spring urged, in a direction facing towards the transfer edge (11*t*, 21*t*).

5. A conveyor arrangement (100), comprising a first mobile conveyor (1), comprising:

a first conveying track (11) adapted to convey an object (9) between different positions along the first conveying track (11), a drive module (12) adapted to change its position within an area of operation, in particular in a non-mechanically track-bound manner;

wherein the first conveying track (11) is fixed to the drive module (12), so that changing the position of the drive module (12) leads to a similar change of position of the first conveying track (11);

wherein the conveyor arrangement (100) is adapted in a manner that by operation of the drive module (12) the first mobile conveyor (1) can be transferred between a handover state, and a separated state in relation to a second conveying track (21) of a second conveyor (2);

wherein during the handover state the first conveying track (11) is in alignment with the second conveying track (21) of the second conveyor (2), so that by operation of the first and second conveying tracks (11, 21) an object (9) can be transferred between the first conveyor (1) and the second conveyor (2); and wherein during the separated state the first conveying track (11) is not in alignment with the second conveying track (21) so that by operation of the first and second conveying tracks (11, 21) the object (9) cannot be transferred between the first conveyor (1) and the second conveying track (21);

wherein the conveyor arrangement (100) further comprises a first coupling (113) attached to the first conveyor (1) and a second coupling (213) attached to the second conveyor (2); and wherein the first coupling (113) and the second coupling (213) are adapted to selectively provide a holding force between the first conveyor (1) and the second conveyor (2) in the handover state, further wherein the holding force prevents a removal of the first conveyor (1) from the second conveyor (2).

6. The conveyor arrangement (100) according to claim 5, further comprising a second stationary conveyor (2), in particular a plurality of second stationary conveyors (2), comprising:

a second conveying track (21) adapted to convey said object (9) between different positions along the second conveying track (21), and a support frame (22) adapted to stationarily support the second conveying track (21) at a predefined position.

7. A conveyor arrangement (100), comprising a first mobile conveyor (1), comprising:

a first conveying track (11) adapted to convey an object (9) between different positions along the first conveying track (11), a drive module (12) adapted to change its position within an area of operation, in particular in a non-mechanically track-bound manner;

wherein the first conveying track (11) is fixed to the drive module (12), so that changing the position of the drive module (12) leads to a similar change of position of the first conveying track (11);

wherein the conveyor arrangement (100) is adapted in a manner that by operation of the drive module (12) the first mobile conveyor (1) can be transferred between a handover state, and a separated state in relation to a second conveying track (21) of a second conveyor (2);

wherein during the handover state the first conveying track (11) is in alignment with the second conveying track (21) of the second conveyor (2), so that by operation of the first and second conveying tracks (11, 21) an object (9) can be transferred between the first conveyor (1) and the second conveyor (2);

wherein during the separated state the first conveying track (11) is not in alignment with the second conveying track (21) so that by operation of the first and second conveying tracks (11, 21) the object (9) cannot be transferred between the first conveyor (1) and the second conveying track (21);

wherein the first mobile conveyor (1) comprises a first connector (16) adapted to provide a, in particular wired, connection between the first conveyor (1) and the second conveyor (2) in the handover state;

further wherein the first connector (16) is adapted:

to transfer energy between the first conveyor (1) and the second conveyor (2) in the handover state, in particular the transferred energy is adapted to provide power for operating the second conveying track (21), and/or to transfer data between the first conveyor (1) and the second conveyor (2) in the handover state, in combination via a second connector (26) of the second conveyor (2); and wherein the first connector (16) and the second connector (26) are adapted, to establish a wireless connection between the first conveyor (1) and the second conveyor (2) in the handover state.

8. The conveyor arrangement (100) according to claim 7, further comprising a second stationary conveyor (2), in particular a plurality of second stationary conveyors (2), comprising:

a second conveying track (21) adapted to convey said object (9) between different positions along the second conveying track (21), and a support frame (22) adapted to stationarily support the second conveying track (21) at a predefined position.

9. The conveyor arrangement (100) according to claim 7, wherein the first conveyor (1) comprises an energy storage (13) for providing power for the operation of the drive module (12), in particular via a power line (pl); and wherein the conveyor arrangement (100) is adapted to provide energy from the energy storage (13) for the operation of the second conveying track (21) during the handover state.

10. The conveyor arrangement (100) according to claim 9, wherein the wireless connection is adapted to transfer energy between the first conveyor (1) and the second conveyor (2), and the transferred energy is used to power the second conveying track (21).

* * * * *